Jan. 19, 1954  E. ROOT III  2,666,267
OPTICAL MEASURING APPARATUS
Filed Dec. 27, 1948

2 Sheets-Sheet 2

INVENTOR.
Elihu Root III
BY Kenway Jenney Witter
& Hildreth
Attorneys

Patented Jan. 19, 1954

2,666,267

UNITED STATES PATENT OFFICE 2,666,267

OPTICAL MEASURING APPARATUS

Elihu Root III, Springfield, Vt.

Application December 27, 1948, Serial No. 67,277

10 Claims. (Cl. 33—199)

The present invention relates to measuring apparatus, and more particularly to apparatus for accurately measuring and calibrating mechanical devices.

In my co-pending application Serial No. 768,300 filed August 13, 1947, now Patent No. 2,604,004, I have described a highly accurate measuring system involving the principles of optical interference. In essence the invention described therein comprises means for effecting an accurate measurement by automatically counting the number of wavelengths of light between two points.

The principal object of the present invention is to provide a substantially continuous record of the deviation from standard of all portions of a mechanical piece. For example, a lead screw, which is to be used in a precision machine tool, is to be accurately calibrated so that its accuracy throughout its length may be known. The calibration of a lead screw will be used for the specific description of this invention, although the invention is applicable to the calibration of other parts, as will be apparent to those skilled in the art.

With the foregoing and other objects in view, as will hereinafter appear, the principal feature of the invention comprises a suitable drive for the part to be calibrated, a record sheet driven in correlation therewith, and optical means to measure the motion of said part, with means for marking the record sheet in accordance with point-to-point measurements on said part in terms of wavelengths of light. In the preferred form of the invention the recording means comprises a traveling sheet, in combination with one or more traverse electrodes, which are energized at definite intervals, which intervals are measured in terms of a definite count of wavelengths. Preferably the motions are so correlated that a perfect part will result in a straight-line record along the sheet, while variations from standard are indicated by sloping lines. Thus in the case of a lead screw, periodic or random variations in pitch are represented by a wavy line, while a cumulative error is represented by a series of sloping lines.

Other features of the invention consist of certain novel features of construction, and combinations and arrangements of parts, hereinafter described and particularly defined in the claims.

Figure 1:
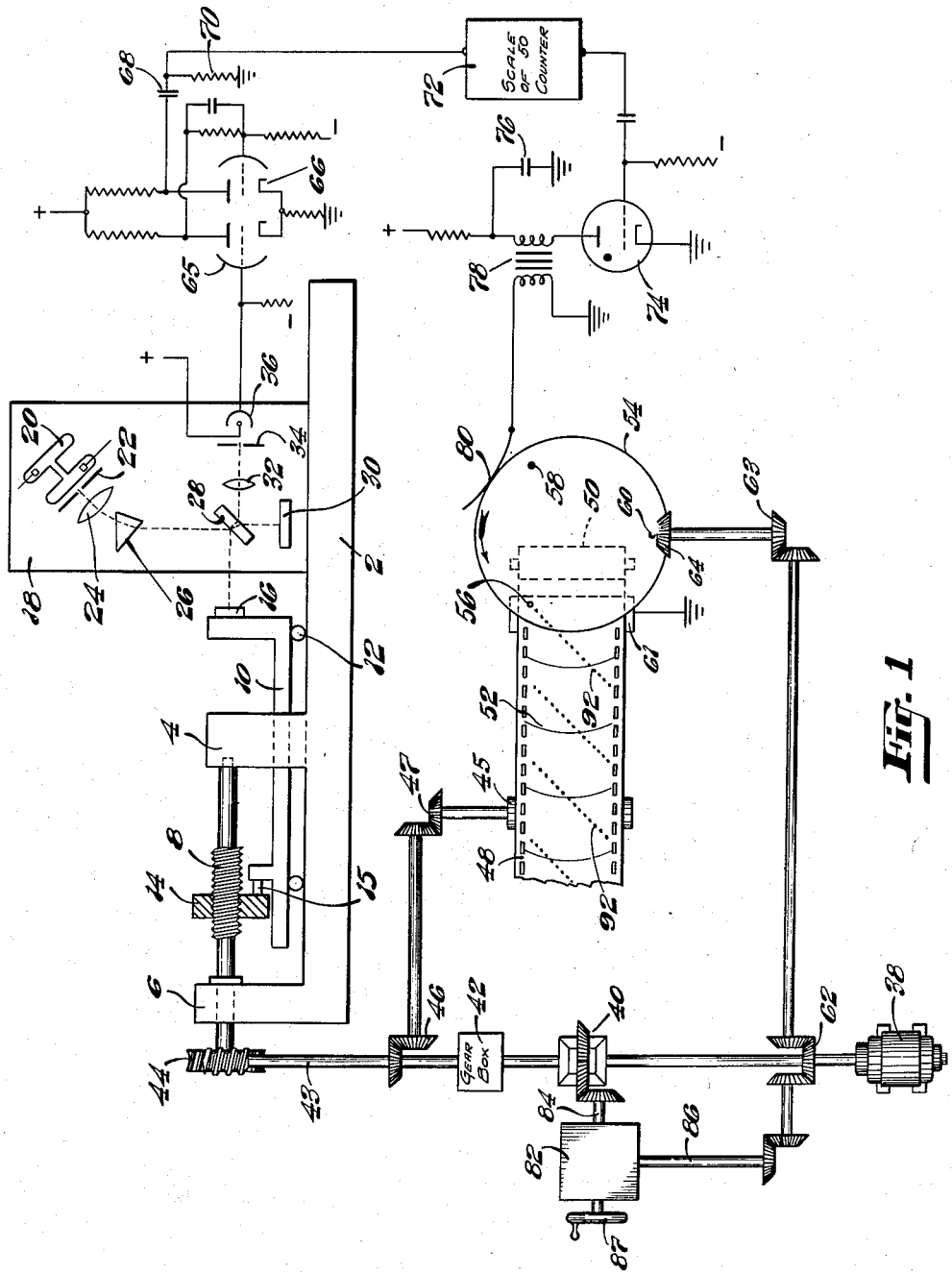
Figure 2:
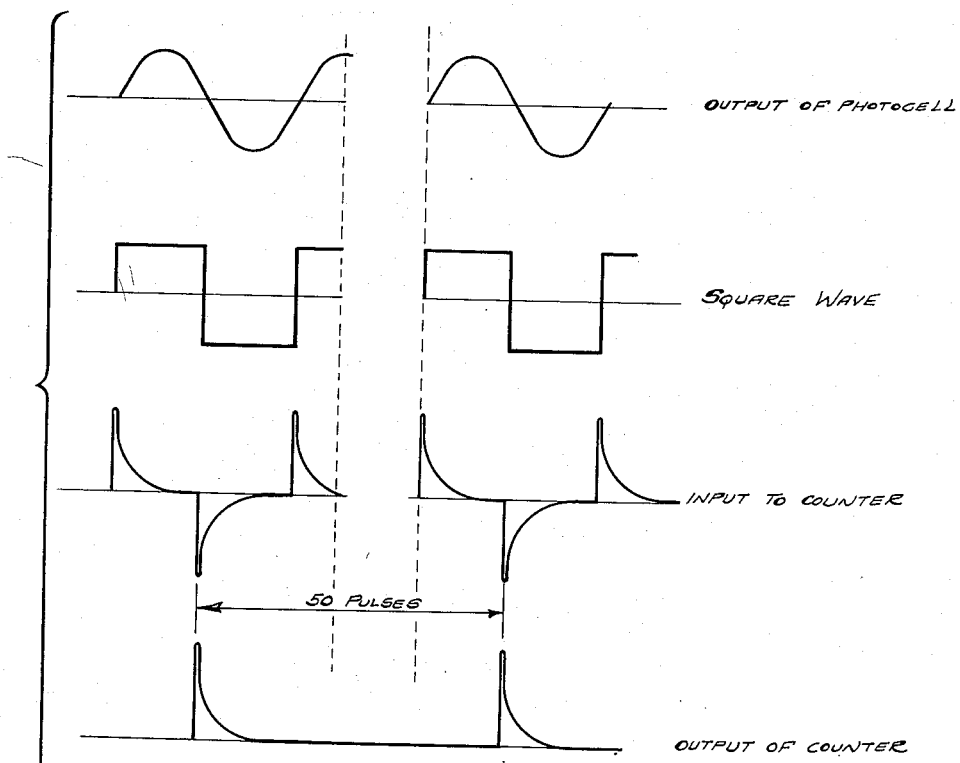
Figure 3:
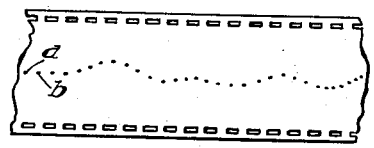
Figure 4:
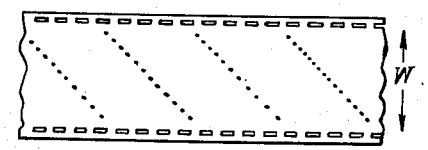
Figure 5:
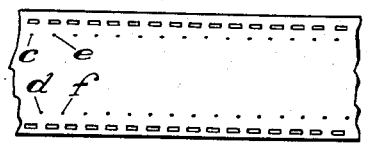

In the accompanying drawings, Fig. 1 is a diagram of the preferred form of apparatus according to the present invention; Fig. 2 is a diagram illustrating the wave forms at different parts of the apparatus; and Figs. 3, 4 and 5 are representations of typical records obtained by the apparatus.

The illustrated embodiment of the invention comprises apparatus for accurate calibration of a lead screw of a type to be used in a precision lathe.

As shown in Fig. 1 a bed 2 carries bearings 4 and 6 in which are mounted the screw 8 whose accuracy is to be measured. A carriage 10 is adapted to move along bed 2 in a direction parallel to the axis of screw 8. To reduce friction the carriage 10 may roll on balls indicated at 12, mounted in suitable carriers or races, not shown. A follower 14 may be resiliently mounted on carriage 10 by means of reeds 15. The follower 14 may take the form of a full or partial nut engaging the screw. Alternatively, the screw may be mounted in a fixed nut, engaging carriage 10 with its end so that the entire screw advances on rotating and moves carriage 10 with it.

A plane reflecting surface 16 is mounted on carriage 10 at right angles to the axis of screw 8 and preferably with that axis passing through its center. The surface 16 is part of an interferometer. The remaining parts of the interferometer are mounted on a carriage 18 which is adapted to move along the bed 2 in a direction parallel to the axis of the screw 8. The interferometer comprises, in addition to the surface 16, a source of sharp spectral lines 20, an aperture 22, a collimating lens 24, a prism 26, a plane half-reflecting surface 28, a plane reflecting surface 30, an objective lens 32, an aperture 34, and a photocell 36. The source 20 may be, for example, a krypton lamp provided with a supply of direct current. The reflecting surface 30 is placed so that its image in surface 28 is accurately parallel to the surface 16, and may be provided with angular adjustment means to maintain this condition at all times. The aperture 34 is placed so that a beam of light reflected from surface 16 parallel to the axis of screw 8 will enter the photocell. The photocell 26 is preferably of the multiplier type, but is shown as a simple type for clearness. Source 20, aperture 22, lens 24, and prism 26 are placed so as to allow light of a single selected wavelength emitted by source 20 to enter aperture 34.

A motor 38 drives the screw 8 through a differential gear 40, a gear ratio selection unit 42, an output shaft 43 and an accurate worm gear 44. A sprocket 45 is driven from shaft 43 through bevel gears 46, 47 at a rate which bears a constant ratio to the rotation of the screw. Sprocket 45 engages a strip of recording paper 48 which is fed from a roll 50. The paper 48 may carry coordinate lines 52 based on degrees of rotation of screw 8.

A disc 54 is also driven by the motor 38. Disc 54 carries one or more marking devices 56, 58, 60 which project downward toward the surface of paper 48 as it passes over an electrode plate 61. The marking devices are adapted to make dots on the paper through impulses applied thereto; preferably they comprise pins to which electrical impulses are applied, and the paper 48 is electrical recording paper. To drive the disc, the motor shaft connects with the disc through suitable gearing, here shown as bevel gearing 62, 63, 64.

The carriage 18 is normally fixed with respect to bed 2 while the machine is operating. As screw 8 rotates, causing the carriage 10 to move along the bed 2, the intensity of the light reaching photocell 36 varies in a sinusoidal manner by reason of the optical interference effects, which require no further description. The signal from the photocell 36 is fed to the grid of tube 65. Tube 65 together with tube 66 is connected in a direct coupled trigger circuit which converts the sine wave signal from the photocell to a square wave. The square wave output is taken from the plate of tube 66 and fed into a differentiating circuit comprising condenser 68 and resistance 70. The differentiating circuit converts the square wave into a series of alternate positive and negative pulses which are fed into an electronic counter 72 of conventional construction. The character of the wave is shown diagrammatically for the several points in Fig. 2. The counter 72 preferably registers pulses of only one polarity, for example, negative pulses, and is arranged to give a positive output pulse upon each registration of a given number, for example 50, of input pulses. Thus, the counter 72 may be designated a scale-of-50 counter, and its actual construction may take any suitable form, as will be understood by those skilled in the art. An important function of the trigger circuit containing tubes 65 and 66 is to prevent registration of false pulses due to noise in the photocell circuit. This is accomplished by separating the trigger tripping potentials for increasing and decreasing signals by an amount greater than the noise amplitude.

The output pulses from counter 72 are applied to the grid of a discharge tube 74, causing a condenser 76 to discharge through the primary of a transformer 78. Current from the secondary of transformer 78 passes to the disc 54 through a brush 80, and thence through one of the recording pins (56, 58, 60), and through the paper 48 to the grounded electrode plate 61, leaving a mark on the paper. A mark may thus be made on the paper every time carriage 10 advances a distance equal to 50 half wavelengths of light. Thus the counter 72 may be considered to be a "wavelength counter" since it is effective to mark the paper upon motion of the carriage in multiples of wavelengths of light.

The gear ratio of unit 42 is preferably so chosen in relation to the pitch of screws 8 that if screw 8 is perfectly accurate, the recorded marks on paper 48 will lie in a straight line parallel to the direction of motion of the paper. In general such a gear ratio is difficult to obtain by simple gearing because of incommensurability, and will further be subject to slight modification from time to time due to such factors as temperature, air pressure, and humidity. In order to make it possible to use simple gearing in unit 42 and to make possible the various corrections in ratio, a multiplier unit 82 has been provided. The multiplier 82 is a continuously acting mechanical multiplier of conventional construction, such as a variable speed drive, having a constantly driven input shaft 86 driven from the motor 38 through suitable gearing, and a rate adjustment shaft 87 represented by a hand crank. The multiplier is arranged so that the angular position of its output shaft 84 represents the product of the angular position of input shaft 86 and a constant (the angular position of the input shaft attached to handwheel 87). The various correction factors are added and entered on the handwheel 87 prior to operation of the machine. The multiplier 82 may take any well-known form, such as the ball-and-disk or the sliding-linkage type, and is not illustrated in detail.

The output of multiplier 82 is added to the input of gear unit 42 through the differential gear 40. In general the contribution of multiplier 82 to the input of unit 42 will be very small in proportion to the direct contribution of motor 38, so that the multiplier 82 is not necessarily of high accuracy.

For a given pitch of screw 8 there are a number of ratios for the gear unit 42 which will produce record lines parallel to the direction of motion of the paper 48 if the screw is a perfect one. However, since the lateral position of a point on the paper is not correlated absolutely with any particular starting point on the screw, it is essential that the record line or lines be permitted to start anywhere on the sheet. Furthermore, in case of drift sufficient to carry the record line beyond the boundaries of the sheet, the invention provides for introduction of another record line which may be considered to piece on to the first one. This may be seen from Figs. 1 and 4.

As a particular example, assume that the gear ratios are such that the disc 54 makes ⅙ of a turn while the carriage 10 moves a distance of 50 half-wavelengths. Assume further that the counter 72 is on a scale of 50, and that the disc 54 rotates counterclockwise and has three equally spaced recording pins. It is also necessary in this example that the sheet 48 span at least half the distance between two successive recording points; in other words, the sheet 48 (or the recording portion thereof) should span a chord of about 60° of the circumference of the disc. A dot will be made on the paper at a point indicated in Fig. 3 at a, when one of the recording pins (say pin 56) is over the paper. Assume that this point is at the center of the sheet although it need not be. The next impulse will come when the disc has moved 60° and there will be no recording pin over the paper. The next impulse will come when the disc has moved 60° more and the pin 58 is over the paper. If the screw is perfect in the interval between these two points, the second point will be at b on the same straight line.

If on the other hand the first recording pin 56 makes its first mark c at the extreme upper edge of the sheet as shown in Fig. 5, the next impulse will cause the same pin 56 to make a dot d on the lower edge of the sheet. The next two impulses e and f will be made by the pin 58 at the top and bottom of the sheet respectively. The points c, e, etc. will form a record line at the top edge of the sheet, while the points $d$, $f$, etc. will form a line at the bottom, if the screw is perfect.

If the screw is not perfect, the dots will drift one side or the other as shown in Fig. 3. In the case where the record line starts in the center of the sheet, or near it, as shown in Fig. 3, and the deviations are not large, only a single line will appear. However, if the line is near the edge of the sheet, or in the extreme case where two lines are shown as in Fig. 5, any deviation will tend to cause one of the lines to move off the sheet. The record in that case will be preserved by the other line. It will also be seen that no matter what the deviations are, anything that causes the record to drift off the sheet will result in the introduction of a continuing record at the other side of the sheet. Thus, in Fig. 1, the record indicates that the screw has too coarse a pitch since successive dots are made earlier and earlier in the cycle of the revolution of the disc. The record line thus continually runs off the upper edge of the sheet and starts at the bottom edge. In the case of too fine a pitch, the record will be as indicated in Fig. 4 wherein the record continually runs off the sheet at the lower edge.

Since in this case a line is formed by alternate impulses, the longitudinal spacing between successive dots on any line corresponds to a carriage motion of 100 half-wavelengths. Of course the ratios of gears 44, 46, 47 may be so chosen as to give a paper travel either greater or less than the actual carriage travel.

The lateral spacing between points is determined as follows: In the foregoing example, the gear ratio 42 is such that the disc 54 revolves 1/6 of a revolution for a carriage advance of 50 half-wavelengths. Thus, the distance between the extreme lines in Fig. 5 corresponds to a measure of 50 half-wavelengths. The deviations of the screw from perfection may therefore be determined by scaling the deviations of the record from a straight line.

It is, however, not necessary to use the foregoing ratio. As another example the ratio may be such that the disc 54 revolves 5/6 turn for 50 half-wavelengths advance of the carriage. In that case, referring to Fig. 3, the first dot would be made by pin 56 and the second one by pin 60. The record would be in all respects similar to that obtained for the other ratio, except that the distance between the edges of the sheet would correspond now to a distance of only ten half-wavelengths. In other words, by increasing the speed of the disc, the sensitivity of the record is increased. Furthermore, it is not necessary to use three pins. One, two, or in fact any number of recording pins may be used. It will be seen that many possible combinations of gear ratio 42, with various numbers of recording pins will suffice to give a straight record line for a perfect screw. However certain arrangements which will normally be preferable for reasons of simplicity and economy may be found by application of the following general conditions: The recording pins will be uniformly spaced; the width W of the recording portion of the paper will be such that not more than one pin will be in recording position at any one time, thus eliminating the need for a circuit capable of recording simultaneously at two or more points; at least one and not more than two record lines will cross every coordinate line 52; and any record line will contain points corresponding to every second recording pulse (this makes full use of the capacity of the recording circuit pursuant to condition 2). As a consequence of the foregoing, width W will not be less than the chord of one half the arc between two adjacent pins. The gear ratio 42 will be such that disc 54 turns $m/2n$ of a revolution between successive recording impulses where $m$ is any odd integer and $n$ is the number (odd or even) of recording pins ($m$ may be greater or less than $2n$).

If the above conditions are followed, it will be found that the separation between two record lines (corresponding approximately to W will correspond to a screw deviation of $p/m$ half wavelengths where $p$ is the scale of counter 72. The quantity $m/p$ may be designated the "sensitivity" of the record.

It will be understood that even in the case of a perfect screw, the gear ratios must be properly correlated if a straight line record is to be obtained. It is for this reason that the multiplier 82 is provided. The multiplier is capable of producing, in effect, continuous changes in gear ratio, and thus permitting a straight graph to be made in spite of incommensurability between the dimensions of the screw and the wavelength of the light. The multiplier 82 may be omitted, however, in which case a perfect screw may result in a record like that of Fig. 4, in which the successive lines are inclined, and deviations from standard are represented by variations in slope. It will be understood that, owing to the rotary motion of the disc, the lines will not appear straight unless a large number of pins is used. However, by taking account of the curvature, an effective calibration may be obtained. Such a record, although accurate, is less convenient to use than a graph in which the incommensurable factors have been eliminated.

In the event that the screw to be measured is longer than the continuous range over which the interferometer will give sharp fringes, the measurement may be made in several steps. As the interferometer approaches the end of its range, motor 38 is stopped and carriage 18 is moved to a new position. The instrument is then ready for the start of a new step. In general there will be a discontinuity of the record every time that carriage 18 is moved, however the total error of the screw may be obtained by adding together the errors obtained separately from the continuous part of the record for each step. In some cases it may not be necessary to stop motor 38 between steps, since if carriage 18 is moved quickly enough the error in the screw which would have been shown by the short portion of the record thus lost may be negligible.

From the foregoing description, it will be seen that the invention provides a simple and exceptionally accurate means for making a complete calibration record of the deviations of a mechanical piece from standard. Although the preferred form of the invention has been shown and described, the invention is not limited to the particular embodiment herein described but may be varied within the purview of the appended claims. Furthermore, the invention is not limited to calibration of a lead screw but may be applied to a cam or other mechanical part, the motion of which is utilized to effect motion of a part of the interferometric measuring system.

Having thus described the invention, I claim:

1. Measuring apparatus comprising a follower to engage a piece to be measured, drive means for causing relative motion between said piece and the follower, optical means for accurately measuring the linear displacement caused by said motion in terms of wavelengths of light, a recorder having means for moving a record sheet in accordance with the motion of the drive means, a marking device for the recorder, means for effecting a traverse of the marking device relative to the sheet at a rate determined by the motion of the drive means, and means for applying successive activating impulses to the marking device at regular displacement intervals of said relative movement between the piece and the follower, to cause successive points to appear on the record sheet, one coordinate of their position being dependent on the motion of the drive means and the other on the relative motion of the piece and its follower.

2. Measuring apparatus comprising a follower to engage a piece to be measured, drive means for causing relative motion between said piece and the follower, optical means for accurately measuring the linear displacement caused by said motion in terms of wavelengths of light, a recorder having means for moving a record sheet in accordance with the motion of the drive means, a rotary marking device for the recorder, means for rotating the marking device to cause it to travel generally crosswise of the sheet at a rate determined by the motion of the drive means, and means for applying successive activating impulses to the marking device at regular displacement intervals of said relative movement between the piece and the follower, to cause successive points to appear on the record sheet, one coordinate of their position being dependent on the motion of the drive means and the other on the relative motion of the piece and its follower.

3. Measuring apparatus comprising a follower to engage a piece to be measured, drive means for causing relative motion between said piece and the follower, optical means for accurately measuring the linear displacement caused by said motion in terms of wavelengths of light, a recorder having means for moving a record sheet in accordance with the motion of the drive means, a marking device for the recorder having a recording pin arranged to traverse the sheet at a rate determined by the motion of the drive means, and means for applying successive marking impulses to the pin upon relative movement of said piece and follower through predetermined displacement intervals.

4. Measuring apparatus comprising a follower to engage a piece to be measured, drive means for causing relative motion between said piece and the follower, optical means for accurately measuring the linear displacement caused by said motion in terms of wavelengths of light, a recorder having means for moving a record sheet in accordance with the motion of the drive means, a marking device for the recorder having an electrical recording pin, means for causing the pin to traverse the sheet at a rate determined by the motion of the drive means, and means for applying successive electrical impulses to the pin upon relative movement of said piece and follower through predetermined displacement intervals.

5. Measuring apparatus comprising a follower to engage a piece to be measured, drive means for causing relative motion between said piece and the follower, optical means for measuring the linear displacement caused by said motion in terms of wavelengths of light, a wavelength counter, a recording device having means to mark a record sheet, and connections between the counter and the marking means to deliver a marking impulse thereto at successive intervals measured by a predetermined wavelength count.

6. Measuring apparatus comprising a follower to engage a piece to be measured, drive means for relatively moving said piece and the follower, an interferometer of which one element moves with the follower to form a succession of interference fringes during said relative motion, counting means for said fringes, means for generating an impulse upon each count of a predetermined number of fringes, a recording device having means for moving a record sheet and a marking device, means for causing the marking device to traverse the sheet, and connections to deliver said impulses to the marking device.

7. Measuring apparatus comprising a follower to engage a piece to be measured, drive means for relatively moving said piece and the follower, an interferometer of which one element moves with the follower to form a succession of interference fringes during said relative motion, counting means for said fringes, means for generating an impulse upon each count of a predetermined number of fringes, a recording device having means for moving a record sheet, a marking device including a rotary member having a marking pin, and connections to deliver said impulses to the pin.

8. Measuring apparatus comprising a follower to engage a piece to be measured, drive means for relatively moving said piece and the follower, an interferometer of which one element moves with the follower to form a succession of interference fringes during said relative motion, counting means for said fringes, means for generating an activating impulse upon each count of a predetermined number of fringes, a recording device having means for moving a record sheet, a marking device including a rotary member having a number of marking pins spaced in uniform angular relation thereon, and means to deliver said activating impulses to said pins.

9. Measuring apparatus comprising a follower to engage a piece to be measured, drive means for causing relative motion between said piece and the follower, a recorder having means for moving a record sheet in accordance with the motion of the drive means, a marking device for the recorder, gearing associated with the drive means to cause the marking device to traverse the sheet, optical means for measuring the relative motion between the piece and follower, means for applying successive activating impulses to the marking device upon measurement by the optical means of a linear displacement of a predetermined number of wavelengths of light, to cause successive points to appear on the record sheet, one coordinate of their position being dependent on the motion of the drive means and the other on the relative motion of the piece and its follower, and means for varying the effective gear ratio between the drive means and marking device to fix a desired ratio between the displacement caused by the relative motion and the displacement of the marking device.

10. Calibrating apparatus for a screw comprising drive means for the screw, a follower to be linearly driven by the screw, an interferometer having an element moved by the follower to cause light variations by optical interference, counting means for said light variations, impulse generating means operable upon each count of a predetermined number of light variations, a recording device having means for moving a record sheet, connections from the screw drive means to the recording device to move the sheet at a predetermined rate, a marking device movable laterally of the direction of motion of the sheet, and connections from the impulse generating means to the marking device to apply marking impulses to the sheet, whereby successive record points appear on the sheet having coordinates dependent on the drive means and on the relative motion between the screw and follower.

ELIHU ROOT III.

References Cited in the file of this patent

UNITED STATES PATENTS

| Number | Name | Date |
|---|---|---|
| 1,208,725 | Balderston | Dec. 19, 1916 |
| 1,904,130 | Garms et al. | Apr. 18, 1933 |
| 2,040,501 | Sawford | May 12, 1936 |
| 2,400,828 | Keinath | May 21, 1946 |
| 2,415,229 | Young | Feb. 4, 1947 |
| 2,433,382 | Marrison | Dec. 30, 1947 |
| 2,434,531 | Wilson et al. | Jan. 13, 1948 |
| 2,462,292 | Snyder | Feb. 22, 1949 |

FOREIGN PATENTS

| Number | Country | Date |
|---|---|---|
| 571,923 | Germany | Mar. 7, 1933 |